Aug. 26, 1958     J. B. COLLINS     2,849,676
APPARATUS FOR MEASURING THE MOISTURE CONTENT OF FABRICS
Filed May 1, 1953     2 Sheets-Sheet 1
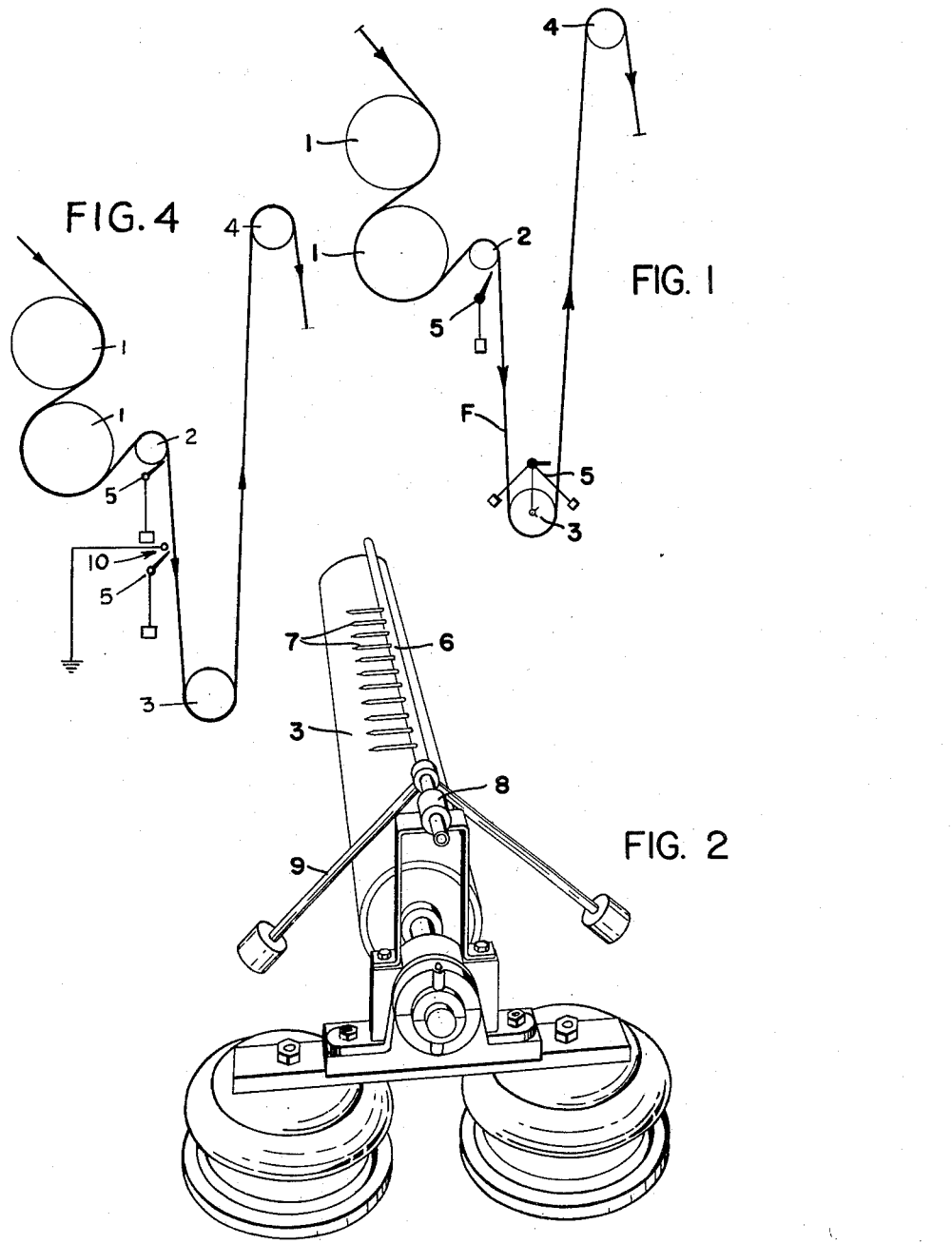
INVENTOR.
JACK B. COLLINS
BY W. A. Fraser
ATTY INVENTOR.
JACK B. COLLINS
BY W. A. Fraser
ATTY

United States Patent Office 2,849,676
Patented Aug. 26, 1958

2,849,676

APPARATUS FOR MEASURING THE MOISTURE CONTENT OF FABRICS

Jack Bertram Collins, Isleworth, England, assignor to The Firestone Tire & Rubber Company, Akron, Ohio, a corporation of Ohio Application May 1, 1953, Serial No. 352,317

2 Claims. (Cl. 324—65)

The present invention relates to a method of measuring the moisture content of fabrics and to apparatus for carrying out such method.

In the manufacture of tires the fabrics used therein have at one stage to be dipped in an aqueous dispersion of rubber to impregnate the same with a proportion of rubber. After dipping, the fabric passes through an oven to reduce the moisture content of the fabric down to a small percentage, between definite limits. It is most important that the percentage of moisture should be accurately controlled as the stretch of the cord fabric is largely affected, particularly in the case of where the cord is made of rayon.

It will be appreciated, therefore, that in the manufacture of tire cord fabric or in any wet processing of textiles, such as sizing, a method of accurately measuring the amount of moisture is of considerable importance to enable control of the final moisture content to be carried out effectively. To permit the moisture content of the fabric in a process to be controlled, it must be determined quickly so as to allow the drying conditions to be modified in response to any fluctuation from the desired value to restore the moisture to the desired control value within a minimum time. When this is achieved an impregnated fabric with a closely controlled moisture content can be turned out in quantity without trouble, since the measuring instrument may be harnessed to a servo-system controlling the apparatus for drying the fabric, or may be kept under continuous observation by the operator in charge of the machine by means of which the process is being effected.

Whilst the applicability and utility of a method or apparatus for measuring the moisture content of fabrics has been considered with reference to the dipping of cord fabrics used in the manufacture of tires, this is only by way of example and it is not to be considered as in any way limiting the scope of the method of measurement hereinafter described.

As has already been stated, it is clearly desirable that the measurement of the final moisture content (where it is of importance) be determined as quickly as possible after the fabric passes out of the drying stage at the end of the treatment process, so that the drying conditions may be altered immediately to restore the moisture content of the fabric of the particular roll being processed to the control value, if it is found that the moisture content has departed from it. This has not previously been possible in dipping of tire cord fabrics, because the known instruments for the rapid determination of moisture content were not of sufficient accuracy. The only known method of sufficient accuracy for determining moisture content depended on taking a control sample from a roll of fabric and then determining the moisture content in the laboratory, which took a period of hours, so that there was a long lag before the operating conditions of the processing machine could be altered in response to divergencies from the control valve.

It will be appreciated that the long length of fabric is, in impregnating technique, passed through an impregnating bath, then through a drying oven and finally wound into a roll and in consequence with an efficient machine it is moving at a considerable linear velocity, so that the quantity of fabric processed in a given time is high and the rapidity with which a correction can be applied is of importance.

The present invention is concerned with the measurement of the moisture content by an electrical method depending on determining the resistance value of a given length of processed fabric. It is well known that fabric when passing over, rubbing against or separating from any surface tends to become charged to an electrostatic potential that may be of a high order and before ordinary electrical methods can be applied to measure the moisture content of the fabric, this electrostatic charge or its effect must be eliminated. The present invention overcomes this difficulty in a neat and simple manner.

According to the present invention the moisture content of a fabric may be determined by connecting one pole of a D. C. source (substantially ripple free and isolated from earth) through a length of the fabric to earth, whilst the other pole of the D. C. source is connected to earth through a known resistance, the potential difference across which is measured to give a measure of the leakage from the D. C. source through the fabric to earth.

The underlying fundamental basis of the invention is the use of the earth as a zero potential connection between the known fixed resistance and the unknown leakage path represented by the fabric. It will be appreciated that owing to the very high resistance of fabric dried to about 1% residual moisture, as is tire cord fabric, the current flowing through the known resistor is very small and changes of potential across it can only be measured by using a very sensitive instrument, such as a vacuum tube or valve voltmeter. The known resistor is therefore selected so that the voltage drop across it at the normal operating conditions of the apparatus is about 0.5 volt. By grounding the known resistance and the length of fabric voltages of such low values can be measured accurately with a very senstive vacuum tube voltmeter without having its reading affected by stray induced voltages.

One particular form of apparatus made in accordance with the invention and applied to a tire cord-gum-dipping machine is hereinafter described with reference to the accompanying drawings, wherein:

Figure 1 is a diagrammatic representation of the discharge end of the drying section of the machine.

Figure 2 is a perspective view of an air ionizer unit used in conjunction with the apparatus for the diminution of static electricity induced by separation of the fabric at the rollers used for the measurement of the moisture content.

Figure 4 is a diagrammatic representation of an alternative layout to that shown in Figure 1.

Figure 3:
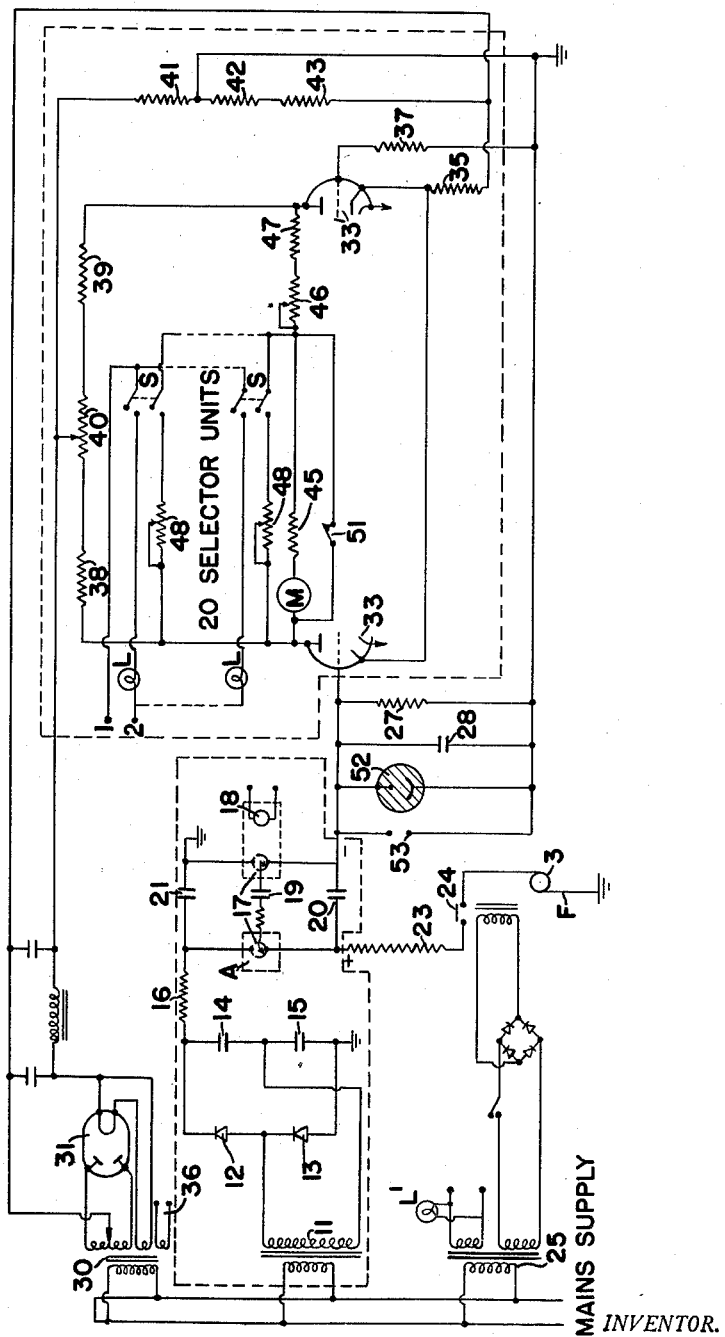
Figure 3 is a circuit diagram of the measuring apparatus.

Figure 1 shows the layout of the discharge end of a gum-dipping apparatus for tire cord fabric. The fabric is drawn out of the drying section of the machine in which it is dried after being dipped in an aqueous dispersion of rubber, by a pair of puller rolls 1, which are cloth-covered and driven at the same peripheral speed as each other. From the puller rolls 1, the fabric passes over an earthed or grounded roll 2 and around a charged roll 3, which is connected to one pole of a 5 kv. D. C. source. The charged roll is, of course, carefully insulated from the frame of the machine. After passing over the charged roll, the fabric is drawn over an idle roll 4 and then wound onto a reel in the usual way.

At the point of separation of the fabric from the rolls 2 and 3, there are provided air ionizer units 5 of the known type. The units 5 are provided to neutralize static charges induced as the fabric passes over these rollers, which would otherwise lead to errors in the operation of the moisture measurement instrument. They each consist of a bar 6 with a number of closely spaced pins 7; the bar 6 is pivotally mounted in bearings 8 at either end and is maintained at the desired angular position by means of a counterweight or counterweights 9. This pivoted construction is provided so that the pins 7 may ordinarily be located very close to the surface of the fabric, but will be swung out of the way and not damaged when contacted by the thickened material at a joint between the material of two rolls of cord fabric.

The lower of the two ionizer units 5 is energized from the D. C. source employed to energize the roll 3; the upper ionizer unit is separately energized from a second D. C. source, which is not shown in the drawings.

The control of the residual moisture in the fabric is exercised by means of an instrument whose circuit is shown in Figure 3. This instrument, which is built around a sensitive valve voltmeter, is connected between earth or ground and the negative of a ripple free D. C. source, isolated from earth, which will be described in greater detail further on, and said instrument is adapted to measure the potential drop across a known resistance. The positive of the D. C. source is connected to the charged roll 3, so that the resistance to leakage across the fabric from the charged roll 3 to the earthed or grounded roll 2 will govern the potential drop across a known resistance connected between earth or ground and the negative of the D. C. source.

It will be appreciated from Figure 1 that the surface resistance between the fabric and the rolls 2 and 3 will, due to the large wrap of fabric around the rolls, be small compared with the resistance of the length of fabric extending between the two rolls 2 and 3. The conductivity of the length of fabric between the two rolls will, of course, be a function of its residual moisture content and, other things being equal, a measurement of that value will permit of a continuous accurate determination of the moisture content being made, even when the moisture content is very low.

The apparatus employed for measuring the moisture content is shown in Figure 3.

The apparatus comprises a D. C. source substantially free from voltage ripple, which is shown enclosed in chain lines at the left hand side of Fig. 3, and per se does not constitute the present invention or part thereof. This source comprises a transformer 11 having its primary connected to the mains and its high-voltage secondary connected with rectifiers 12 and 13 and capacitors 14 and 15 as a voltage-doubling arrangement of the half-wave rectified output of the transformer. The output of the voltage doubler is applied through a suitable current limiting resistance 16 to the input pole of a pair of rotary switches 17, the moving contacts of which are synchronously driven by a small synchronous motor 18.

A capacitor 19 is connected between the moving contacts of the switches 17 so as to draw charge from the rectifiers when the moving contacts are in contact with the input poles and to supply charge to the output circuit when the moving contact is in contact with the output poles of the switches 17. A second capacitor 20 is connected between the output leads to draw charge from the capacitor 19 when the latter is connected into the output circuit, and to supply charge to the output circuit during the portion of the switch cycle that the capacitor 19 is drawing charge from the rectifiers. A third capacitor 21 is included in the input circuit to the rotary switches to prevent surging in the transformer secondary at the beginning of the charging period of the capacitor 19.

The positive of the D. C. source is connected to the insulated roll 3 through a high resistance 23, employed to limit the possible current flow to a very low value. The roll 3 is connected through the length of fabric F to ground. It is the resistance of this length of fabric that is to be measured indirectly for the determination of its moisture content.

A solenoid operated switch 24 is located in the circuit between the roll 3 and the resistance 23 and this is energized from the rectifier output of a 24-volt tapping from a transformer 25.

The negative of the D. C. source is connected through the fixed resistance 27 (2 megohms) to ground. The measurement of the potential drop across the resistance 27, by means of which the moisture content of the fabric F is arrived at, is measured by the sensitive vacuum tube voltmeter bridge or valve voltmeter bridge shown in chain lines at the right hand side of Fig. 3. This type of voltmeter is employed because it is capable of measuring voltages where the current flowing is very low as in the present case. Although the output voltage of the D. C. source is of the order of 5 kv., the voltage drop across the resistance 27 in the ordinary operating conditions of the apparatus is of the order of .5 volt, because the resistance to the dipped and dried fabric F is extremely high. The fixed resistance itself has a capacitor 28 (4 mfd.) connected in parallel with it to reduce fluctuations.

The high voltage supply for the voltmeter bridge is provided by means of a transformer 30 and full wave rectifying vacuum tube 31 to give approximately 450 volt output.

The voltmeter, which is constructed on well known principles, is built around a double triode vacuum tube, conveniently shown in two sections 33, 33' in Figure 3. The cathode of the tube is connected through a fixed resistance 35 (22 kilohm) to the minus side of the high voltage supply, the cathode heater being connected to a 6.3 volt tapping 36 of the transformer 30.

The grid of the left hand section of the tube is connected to the negative of the D. C. source and the grid of the right hand section of the tube is connected to earth through a resistance 37, equal to resistance 27.

The anodes are connected to the plus side of the high voltage supply respectively through the two equal fixed resistances 38 and 39 (220 ohms) and potentiometer 40 (50 ohms). The voltmeter bridge is completed by three equal resistances 41, 42, 43 (47,000 ohms).

The anode leads are bridged by a meter branch comprising one or more meters, shown for simplicity as a single meter M in series with a small resistance 45 and further small resistances 46 and 47. The meter M and resistance 45 are bridged in operation by one of a number of alternative pre-set variable resistances 48, which are twenty in number, but only two are shown in the accompanying drawing for the sake of clarity.

The resistances 48 are pre-set when the instrument is initially calibrated. The selection of resistance 48 depends on the characteristics of the particular fabric which is being dipped and upon other factors.

The resistances 48 are switched in by means of switches S which simultaneously close a circuit through associated indicating lamps L to indicate which resistance is connected across the meter M. The lamps L and switches S are in circuit with a 20-volt tapping 50 of the transformer 25. The circuit also includes a main indicating lamp L'.

The meter M is initially short circuited by a four-minute delay switch 51 of known construction, including a synchronous motor and a solenoid-operated clutch, to prevent violent swings of the meter in the period before the D. C. source has attained full equilibrium.

The end of one roll of fabric is overlapped with the beginning of the next roll and sewn to it. Owing to the extra thickness of material, these "headers" do not dry to the ordinary extent and contain a much greater quantity of moisture, with the result that the voltage across the vacuum tube rises rapidly when a header is being drawn across the space between the two rolls 2 and 3.

In order to avoid damage to the tube when capacitor 28 is unable to smooth out the fluctuation caused, a neon discharge tube 52 firing at 115 volts is connected across the resistance 27 to limit the voltage imposed on the vacuum tube. Leads 53 are also provided across the resistance 27 for the inclusion of a standard cell for calibration purposes.

The voltmeter bridge formed may be initially balanced by suitable adjustment of the potentiometer 40. Thereafter, variation of the moisture content of the fabric leaving the drying section of the gum-dipping unit will be reflected by a variation of the resistance of the length of fabric F extending between rolls 2 and 3. This will cause the potential applied to the grid of the vacuum tube section 33 to become more or less negative, accompanied by a variation of the anode current in this section and a consequential potential difference between the two anodes. This potential difference will be indicated by the meter M, which may be calibrated directly to indicate the degree of moisture.

The calibration should initially be made with the lightest fabric used in the gum-dipping unit. It may afterwards be used for other fabrics by switching in selectively one or other of the pre-set resistances 48, according to the weight and other characteristics of the fabrics concerned.

This instrument, by eliminating the effects of induced static charges, permits a very continuous and immediate determination of the moisture value of a gum-dipped fabric to be made. In consequence, it is now possible to correct the operation of the gum-dipping machine immediately to correct the moisture content and maintain close to a desired control valve. When this has been achieved, it permits a much more accurate building of tires, because the extension value of the tire cord fabric has been rendered substantially constant.

An alternative layout to that shown in Figure 1 is shown in Figure 4 and is found to be more effective in some circumstances. In some cases it is found that with changing conditions the static charge induced on the fabric at the separation from the roller 2 may change from positive to negative and vice-versa. It has also been found that the charge induced at the separation from the roller 3 has relatively little effect. In the modified construction therefore the lower ionizer unit 5 has been removed from proximity of the roller 3 and placed where shown close to the run of fabric F. The two ionizer units are now charged to 10 kv., + and − respectively, and an earthed bar 10 is placed between them. As a result the two ionizers are effective to deal with the induced static charge irrespective of whether a positive or negative charge has been produced. The earthed bar 10 positioned between the ionizer units 5 acts as a leakage path to discharge the residual charged ionized particles emitted from the lower ionizer unit.

What is claimed is:

1. Apparatus for the measurement of the moisture content of a fabric having a small residual moisture content, comprising a substantially ripple free D. C. source isolated from earth, an insulated roll connected to one pole of said D. C. source, an earthed roll spaced from said energized insulated roll, said rolls being adapted to be contacted by the fabric, a fixed resistance connected between the other pole of said D. C. source and earth and a measuring instrument connected to said fixed resistance to determine the potential drop across said fixed resistance for the determination of the moisture content of the fabric.

2. Apparatus for measuring the moisture content of a fabric having a small residual moisture content, comprising a substantially ripple free D. C. source, means electrically connecting one pole of said source to one end of a length of fabric and the other end to ground, a known resistance, means electrically connecting the other pole of said source to one end of said resistance and the other end to ground, and means measuring the potential difference across said known resistance in terms of the moisture content of said fabric.

References Cited in the file of this patent
UNITED STATES PATENTS

| 1,212,014 | Butts | Jan. 9, 1917 |
| 2,088,843 | Davies | Aug. 3, 1937 |
| 2,270,732 | Jones | Jan. 20, 1942 |
| 2,272,239 | Delmhorst | Feb. 10, 1942 |
| 2,457,669 | Hart | Dec. 28, 1948 |
| 2,497,604 | Henry et al. | Feb. 14, 1950 |
| 2,508,045 | Seney | May 16, 1950 |
| 2,595,611 | Simpson et al. | May 6, 1952 |